United States Patent
Arai

(10) Patent No.: US 7,158,223 B2
(45) Date of Patent: *Jan. 2, 2007

(54) TORQUE MEASURING APPARATUS FOR ROTATING BODY

(75) Inventor: Tooru Arai, Kanagawa-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 294 days.

This patent is subject to a terminal disclaimer.

(21) Appl. No.: 10/805,810

(22) Filed: Mar. 22, 2004

(65) Prior Publication Data

US 2004/0187603 A1 Sep. 30, 2004

(30) Foreign Application Priority Data

Mar. 28, 2003 (JP) ............................. 2003-090334

(51) Int. Cl.
*G01J 1/42* (2006.01)
(52) U.S. Cl. ............... 356/218; 73/862.327; 73/862; 250/231.13
(58) Field of Classification Search ................ 356/218; 73/862.324, 862, 1.75, 1.79; 250/231.13
See application file for complete search history.

(56) References Cited

U.S. PATENT DOCUMENTS 6,504,275 B1 * 1/2003 Nondahl et al. .......... 310/68 B
6,624,900 B1 * 9/2003 Eisenhauer et al. ......... 356/614
6,800,843 B1 * 10/2004 Horton ................... 250/231.13
6,907,794 B1 * 6/2005 Arai ....................... 73/862.324

FOREIGN PATENT DOCUMENTS

| EP | 1 170 577 | 1/2002 |
| JP | 6075118 | 3/1994 |
| JP | 11 231320 | 8/1999 |
| JP | 2002-022566 | 1/2002 |
| JP | 2002 261059 | 9/2002 |

* cited by examiner

Primary Examiner—Layla G. Launchman
Assistant Examiner—Tri Ton
(74) Attorney, Agent, or Firm—Fay, Sharpe, Fagan, Minnich & McKee, LLP

(57) ABSTRACT

To achieve the improvement in workability of attachment or detachment of a light receiving fiber for receiving a torque optical signal from a rotor, as well as the improvement in the light receiving efficiency of optical signals, a torque measuring apparatus comprises a rotor having a hollow body portion formed between a drive-side flange portion and a load-side flange portion; light emitting elements disposed on a periphery of the rotor for emitting optical signals based on an output from a torque detection unit arranged on a hollow portion of the hollow body portion; a diffusion means for diffusing the optical signals; and a light receiving fiber attached to a chassis disposed outside the rotor for receiving the optical signals via the diffusion portion.

6 Claims, 7 Drawing Sheets

TORQUE MEASURING APPARATUS FOR ROTATING BODY

BACKGROUND OF THE INVENTION

1. Field of the Invention

The present invention relates generally to a torque measuring apparatus for measuring the torque of a rotating body without contact with the rotating portion, and, more particularly, to a torque measuring apparatus that is improved in workability of an optical fiber attachment and in the light-receiving efficiency of optical signals.

2. Description of the Related Art

A torque measuring apparatus is arranged between a rotating shaft at a drive end and a rotating shaft at a load end to measure rotational torque without contact with these shafts. In one application, the torque measuring apparatus is used to measure rotational torque between a measuring roller and a brake mechanism in a chassis dynamo adopted to be rotated by the wheel of an automobile (see, e.g., Japanese Patent Application Laid-Open No. 2002-22566).

FIG. 1 is a front view of a conventional torque measuring apparatus, while FIG. 2 is a partial cross sectional side view of the conventional torque measuring apparatus.

As shown in FIGS. 1 and 2, a conventional torque measuring apparatus 50 is constructed from a rotor 51 arranged between a drive-side shaft 91 and a load-side shaft 93, and a fixed body 55 fixed to the outside of the rotor 51, and is attached between the drive-side shaft 91 and the load-side shaft 93. The rotor 51 is integrated with a drive-side flange portion 52 attached to a flange 92 of the drive-side shaft 91, a load-side flange portion 54 attached to a flange 94 of the load-side shaft 93, and a hollow body portion 53 between the drive-side flange portion 52 and the load-side flange portion 54, and the fixed body 55 is constructed from an annular portion 56 provided on the outside of the load-side flange portion 54 and a chassis 57 to which the annular portion 56 is fixed via a fixture portion 58.

A primary coil 87 is provided in the annular portion 56 arranged on the outside of the load-side flange portion 54, and a secondary coil 88 is provided around the outer periphery of the load-side flange portion 54, the primary coil 87 and secondary coil 88 forming a rotary transformer 89 to supply power to the rotor 51.

In a hollow portion 59 of the hollow body portion 53, a strain gauge torque detection unit 61 is provided, a plurality of light emitting elements 67a to 67n for emitting light or optical signals based on the output from the torque detection unit 61 are provided around the outer periphery of the load-side flange portion 54, an optical fiber 71 for receiving the optical signals from the light emitting elements 67a to 67n is arranged alongside the primary coil 87 in the annular portion 56, and at the end portion of the optical fiber 71 an optical signal conversion unit (not shown) for conversion to electrical signals is provided.

Consequently, the torque measuring apparatus 50, when the drive-side shaft 91 rotates and drives, detects the output from the torque detection unit 61 via the light emitting elements 67a to 67n and the optical fiber 71, by means of the optical signal conversion unit, whereby the rotational torque is detected.

As described above, although the conventional torque measuring apparatus 50 is interposed between the drive-side shaft 91 and the load-side shaft 93 and can measure torque without being in contact with the rotating portion, the optical fiber 71 for receiving optical signals from the light emitting elements 67a to 67n must be carefully arranged along a channel in the annular portion 56 due to possible damage or the like occurring and causing loss of optical signal characteristics, thus further improvement in workability is desired.

Also, the optical fiber 71 receives optical signals from the light emitting elements 67a to 67n and the received optical signals are transferred through the optical fiber 71. However, because the optical fiber 71 receives the optical signals from a perpendicular direction with respect to the annular direction of the optical fiber 71, it is difficult to transfer them in the annular direction, therefore improvement of the optical signal receiving efficiency is also desired.

SUMMARY OF THE INVENTION

The present invention was conceived in light of these prior art problems, and it is therefore an object of the present invention to provide a torque measuring apparatus that, as well as improving the workability of attaching an optical fiber for receiving optical signals relating to the torque of the rotor, also improves optical signal receiving efficiency.

In order to attain the above object according to a first aspect of the present invention, there is provided a torque measuring apparatus comprising a rotor having a hollow body portion formed between a drive-side flange portion and a load-side flange portion; light emitting elements disposed on a periphery of the rotor, for emitting optical signals based on an output from a torque detection unit arranged on a hollow portion of the hollow body portion; a diffusion means for diffusing the optical signals; and a light receiving fiber attached to a chassis disposed outside the rotor, for receiving the optical signals via the diffusion portion.

The diffusion means is preferably in a form of a diffusion plate for diffusing optical signals, the diffusion plate being mounted on a portion of the chassis opposing to the rotor. The diffusion means may take a form of a diffusion layer disposed on a surface of the optical fiber.

In order to achieve the above object, according to a second aspect of the present invention, there is provided a torque measuring apparatus comprising a rotor having a hollow body-portion formed between a drive-side flange portion and a load-side flange portion; light emitting elements disposed on a periphery of the rotor, for emitting optical signals based on an output from a torque detection unit arranged on a hollow portion of the hollow body portion; and a light guiding plate attached to a chassis disposed outside the rotor, for receiving the optical signals in a planar portion thereof and guiding the optical signals along the planar portion.

BRIEF DESCRIPTION OF THE DRAWINGS

These and other objects, features, aspects and advantages of the present invention will become better understood with reference to the following description, appended claims and accompanying drawings, in which:

DETAILED DESCRIPTION OF THE PREFERRED EMBODIMENTS

The preferred embodiments of the present invention will be described hereinbelow.

Figure 3:
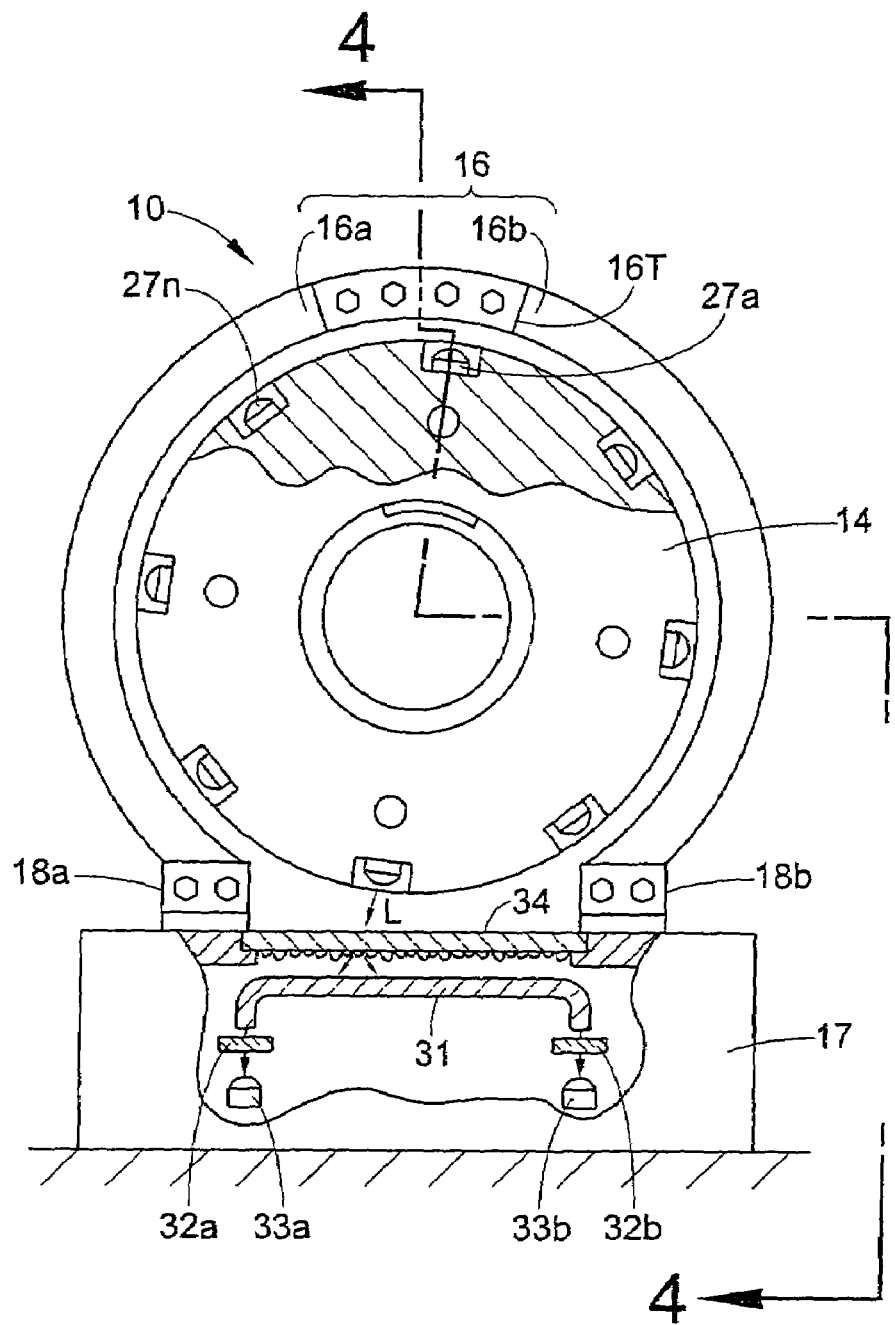
FIG. 3 is a front view of a torque measuring apparatus according to a first embodiment of the present invention.
Figure 4:
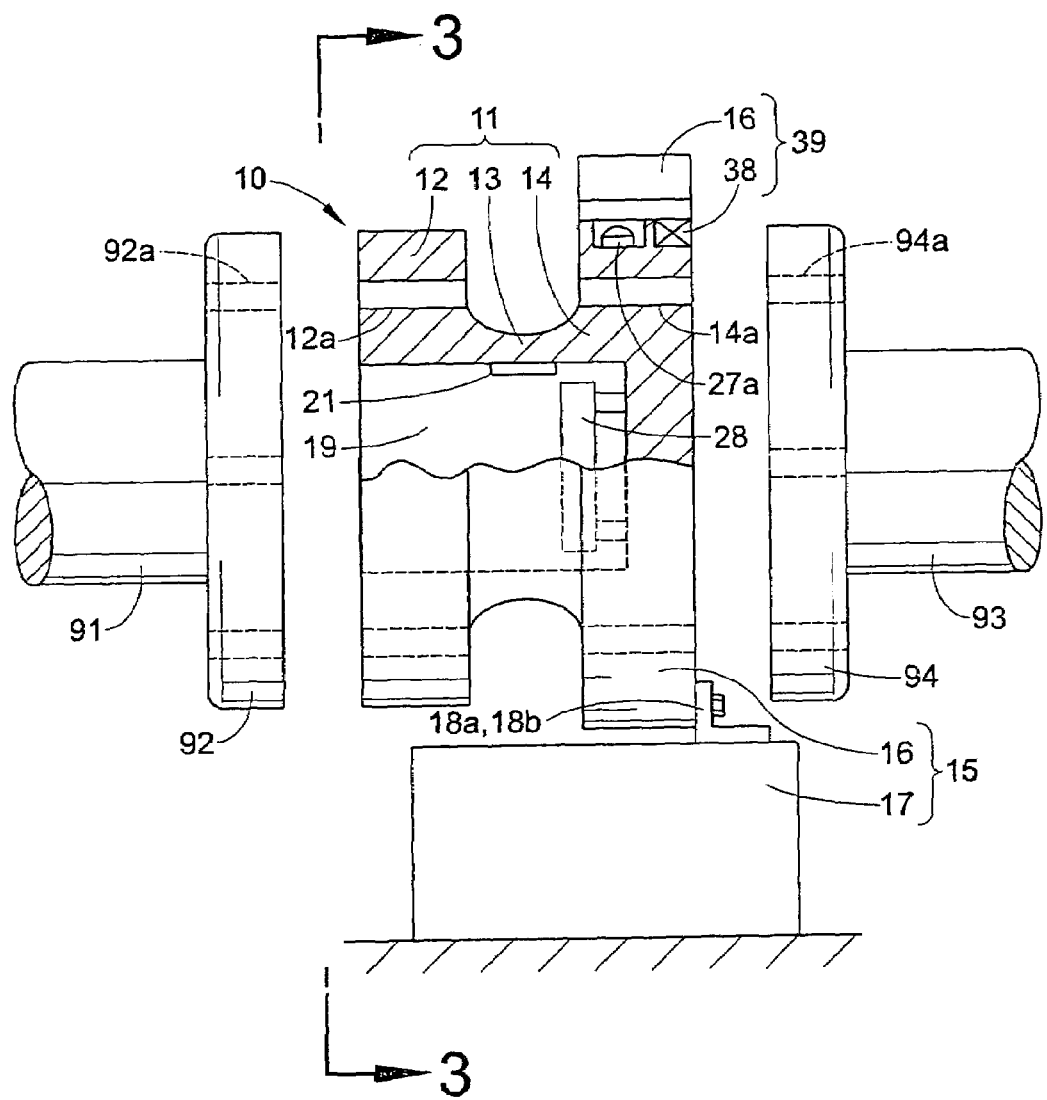
FIG. 4 is a partially cut-away side view of the torque measuring apparatus according to the first embodiment of the present invention.

FIG. 3 is a front view of a torque measuring apparatus according to a first embodiment of the present invention, and FIG. 4 is a partially cut-away side view of the rotor torque measuring apparatus shown in FIG. 3.

As shown in FIGS. 3 and 4, a torque measuring apparatus 10 of the embodiment of the present invention is composed of a rotor 11 arranged between a drive-side shaft 91 and a load-side shaft 93, and a fixed body 15 fixed to the outside of the rotor 11, and is disposed between the drive-side shaft 91 and the load-side shaft 93. The rotor 11 is integrated with a drive-side flange portion 12 attached to a flange 92 of the drive-side shaft 91, a load-side flange portion 14 attached to a flange 94 of the load-side shaft 93, and a hollow body portion 13 between the drive-side flange portion 12 and the load-side flange portion 14. The fixed body 15 is constructed from a half structured annular portion 16 provided on the outside of the load-side flange portion 14 and a chassis 17 to which the half structured annular portion 16 is fixed.

The drive-side flange portion 12 is fixed to the flange 92 by a screw (not shown) passing through a threaded hole 12a in the drive-side flange portion 12 and an attachment hole 92a in the flange 92. Also, the load-side flange portion 14 is fixed to the flange 94 by a screw (not shown) passing through a threaded hole 14a in the drive-side flange portion 14 and an attachment hole 94a in the flange 94. The hollow body portion 13 is twisted by the drive-side flange portion 12 and the load-side flange portion 14 to form a strain-causing body.

A half structured annular portion 16 has semi-annular portions 16a and 16b whose upper ends are both connected by a conductive connecting member 16T, the lower ends of the semi-annular portions 16a and 16b being fixed in an insulated state to fixture members 18a and 18b mounted on the chassis 17. That is, because the half structured annular portion 16 is of a discontinuous annular shape notched at its lower end, and fixed in an insulated state, the half structured annular portion 16 can serve as a primary coil and can be easily attached or detached. This primary coil forms a rotary transformer 39 together with a secondary coil 38 provided on the outer periphery of the load-side flange portion 14, and can supply electric power to the rotor 11.

In a hollow portion 19 of the hollow body portion 13 is provided a strain gauge torque detection unit 21, and a plurality of light emitting elements 27a to 27n are provided along the outer periphery of the load-side flange portion 14 for emitting light in response to the output of the torque detection unit 21 and transmitting an optical signal L. In the chassis 17, an optical fiber 31, for receiving optical signals from the light emitting elements 27a to 27n, is arranged in a linear shape with both end portions bent into L shapes so that it can be compactly housed inside the chassis 17. Also, in the chassis 17 is attached a diffusion plate 34 for diffusing and transmitting optical signals, preventing oil mist, dust and the like from entering to the interior, and protecting the optical fiber 31.

Facing the end surfaces of the optical fiber 31, optical signal conversion units 33a and 33b for receiving optical signals via optical high pass filters 32a and 32b and converting them to electrical signals are provided. Electrical components of the rotor 11 are mounted on a mounting base plate 28.

Figure 5A:
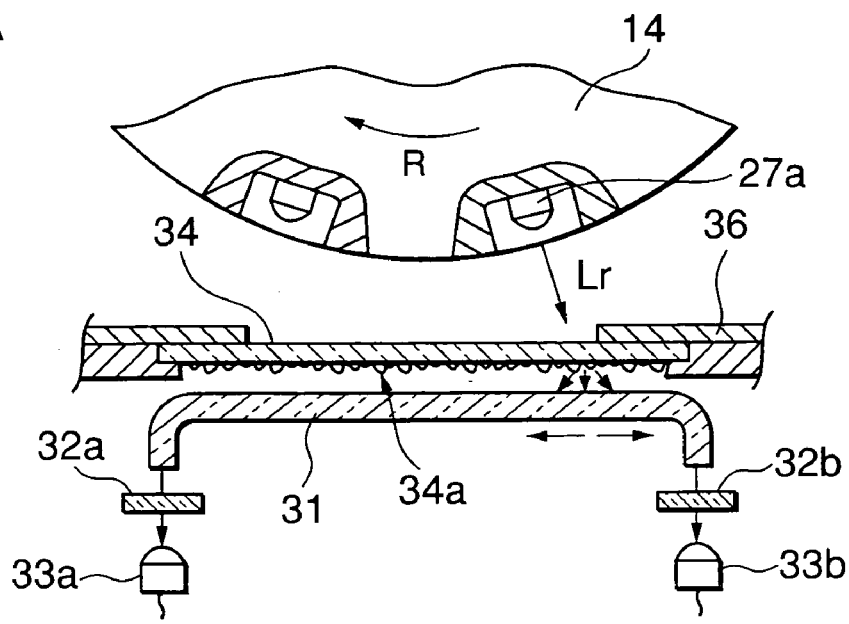
FIG. 5A is a view of a state in which an optical signal is received at end portions of an optical fiber.
Figure 5B:
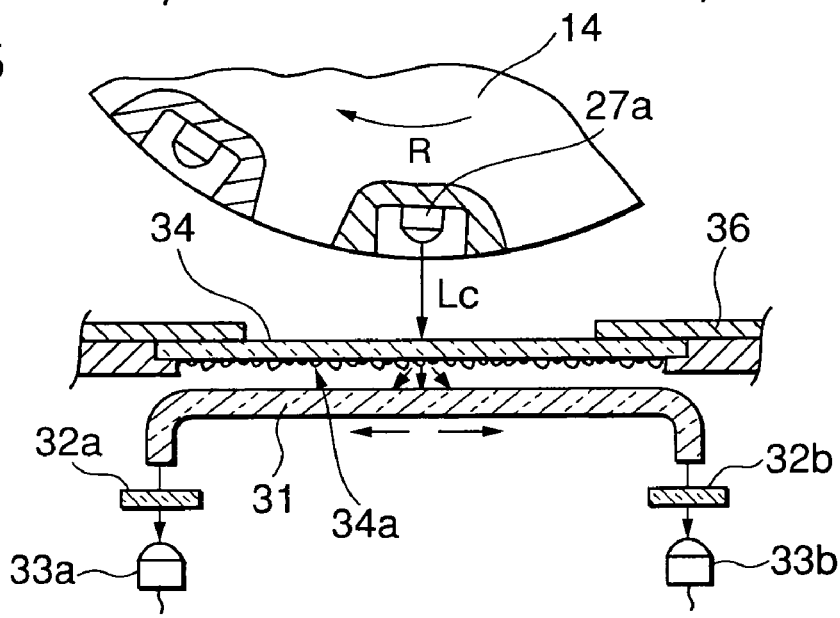
FIG. 5B is a view of a state in which an optical signal is received at the central portion of the optical fiber.
Figure 5C:
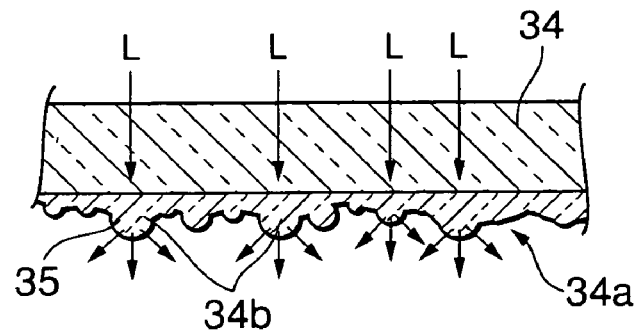
FIG. 5C is an enlarged cross sectional view of a diffusion plate for diffusing optical signals.

FIGS. 5A, 5B and 5C show states in which the optical fiber used in the torque measuring apparatus according to the first embodiment of the present invention receives an optical signal where FIG. 5A is a view of a state in which an optical signal is received at end portions of the optical fiber, FIG. 5B is a view of a state in which an optical signal is received at the central portion of the optical fiber, and FIG. 5C is an enlarged cross sectional view of a diffusion plate for diffusing optical signals.

As shown in FIG. 5A, an optical signal Lr emitted obliquely from the light emitting element 27a toward the right end of the optical fiber 31 is diffused by the diffusion plate 34, so that the optical signal Lr received by the optical fiber 31 is transmitted in both right and left directions in the optical fiber 31. Thus efficient receiving of light is attained. The optical signal Lr transmitted in the left direction from the center in the optical fiber 31 is received by the optical signal conversion unit 33a via the optical high pass filter 32a, and the optical signal Lr transmitted in the right direction is received by the optical signal conversion unit 33b via the optical high pass filter 32b.

Referring to FIG. 5B, when the load-side flange portion 14 rotates as indicated by an arrow R and the light emitting element 27a rotates and moves in this direction, a vertical optical signal Lc emitted from the light emitting element 27a to the central portion of the optical fiber 31 is diffused by the diffusion plate 34, so that the optical signal Lc is transmitted through the optical fiber 31 in both right and left directions. The optical signal Lc transmitted left is received by the optical signal conversion unit 33a via the optical high pass filter 32a, while the optical signal Lr transmitted right is received by the optical signal conversion unit 33b via the optical high pass filter 32b. When the load-side flange portion 14 rotates further as indicated by the arrow R, the optical signal omitted obliquely from the light emitting element 27a toward the left end of the optical fiber 31 is also be similarly received by the optical fiber 31. In this way the light receiving operation for the light emitted from the light emitting element 27a is continuously performed by the optical fiber 31 and consequently the same light receiving operations for the light from the light emitting elements 27b to 27n will also be continuously performed.

As shown in FIG. 5C, the diffusion plate 34 has a diffusion layer 34a formed on the back side, so that the received optical signal L is diffused by beads 34b of the diffusion layer 34a.

The optical fiber 31 receives a larger amount of an optical signal at the L-shaped curved portions at both ends by refraction of the optical fiber compared to the amount of light received at the center of the optical fiber 31. In order to make the amount of light received by the optical fiber 31 as uniform as possible, a shielding plate 36 is provided above the L-shaped curved portions at the ends of the optical fiber 31.

In the present invention, a number of installed light emitting elements 27a to 27n is set so that the optical fiber 31 can continuously receive optical signals from any one of the light emitting elements 27a to 27n. Therefore rotational torque can be measured even when the driven-side and load-side shafts are stopped or rotating at a low speed.

Next, the operation of the torque measuring apparatus according to the first embodiment of the present invention will be described.

As shown in FIG. 4, strain gauges are affixed on the hollow portion 19 of the hollow body portion 13 of the strain-causing body along the circumferential direction, and the strain gauges constitute a part of a Wheatstone bridge to form the torque detection unit 21. An analog output from the torque detection unit 21 is converted to the optical signal L by the light emitting elements 27a to 27n which in turn is transmitted.

In the fixed body 15, the optical signal L from the light emitting elements 27a to 27n is received by the optical fiber 31 after being diffused by the diffusion plate 34, and the received optical signal L transmits in the optical fiber 31 in the left and right directions. The optical high pass filters 32a and 32b remove incidental light caused by fluorescent lamps or the like, and torque detection is performed by converting the optical signal to a torque signal which is an electrical signal by means of the optical signal conversion units 33a and 33b.

In the fixed body 15, a given frequency signal is generated and is transmitted to the rotor side via the rotary transformer 39. Then the transmitted signal is converted to electric power of direct current, and supplied to the rotor 11.

As described above, according to the torque measuring apparatus 10 of the first embodiment of the present invention, when the drive-side shaft 91 is driven, the output from the torque detection unit 21 is converted to the optical signal L by the light emitting elements 27a to 27n which is transmitted to the optical fiber 31 arranged on the chassis 17. Therefore the optical fiber can easily be attached and detached, and workability of optical fiber attachment and maintenance is improved. It is to be noted that the optical signal L emitted from the light emitting elements 27a to 27n is diffused by the diffusion plate 34, so that efficient receiving of the optical signal by the optical fiber 31 is realized.

The optical fiber 31 may be composed of a plurality of optical fibers, and one or more of optical signal conversion units can receive light at both ends of each optical fiber.

Figure 6A:
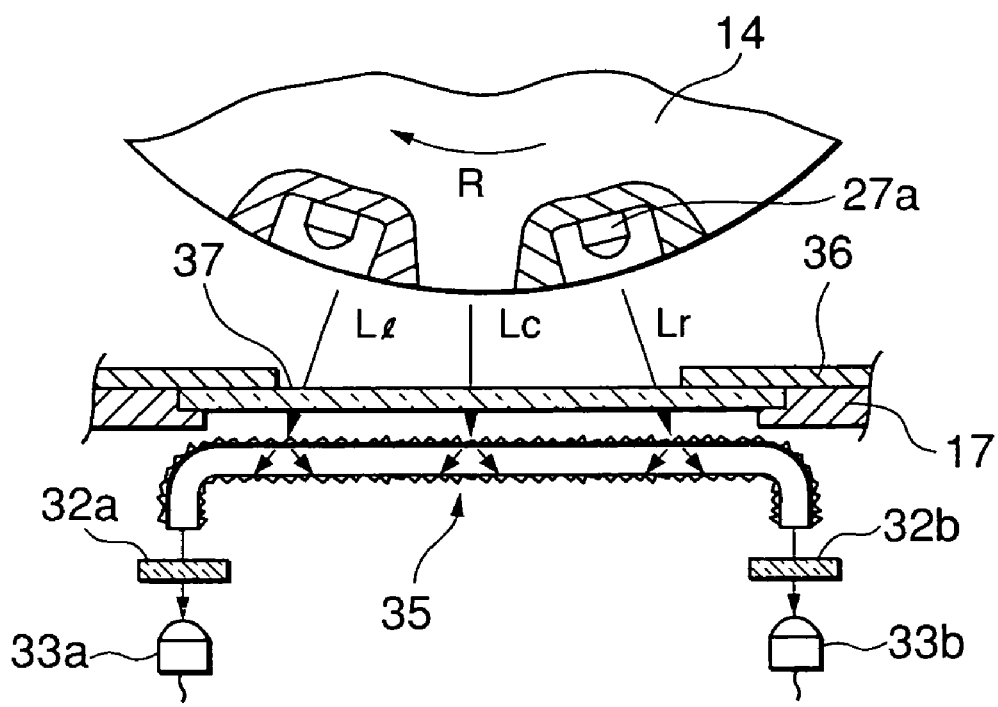
FIG. 6A is a partial front view of a torque measuring apparatus according to a second embodiment of the present invention.
Figure 6B:
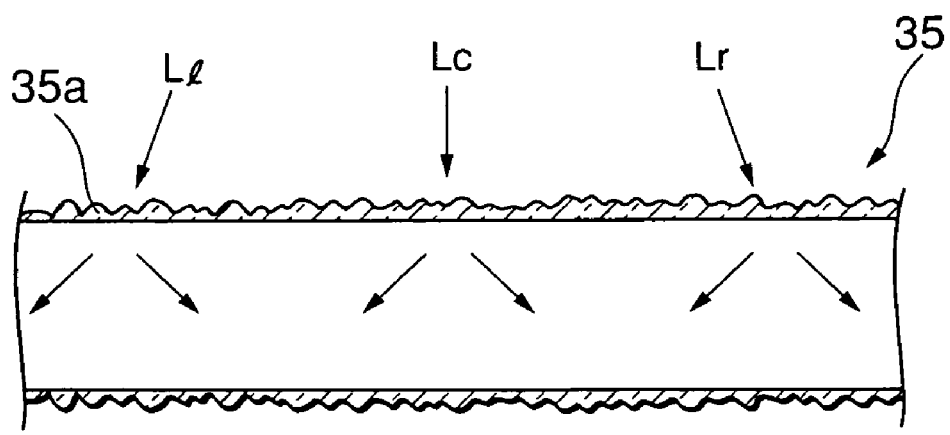
FIG. 6B is a partial enlarged view of the optical fiber with diffusion layer used therein.

FIG. 6A is a partial front view of a torque measuring apparatus according to a second embodiment of the present invention, and FIG. 6B is a partially enlarged view of the optical fiber with a diffusion layer used therein.

FIG. 6A shows a state in which the optical fiber with the diffusion layer, attached to the chassis 17, receives an optical signal. An optical fiber 35 is provided with an optical diffusion layer 35a shown in section in place of the diffusion plate 34 shown in FIG. 3. Except for this optical fiber 35 with the diffusion layer 35a and a transparent plate 37 attached on the chassis 17, the structure of the torque measuring apparatus is the same as the first embodiment of the present invention, and therefore an explanation thereof will be omitted.

The optical signal Lr obliquely emitted from the light emitting element 27a toward the right end portion of the optical fiber 35 with the diffusion layer 35a is diffused by the optical diffusion layer 35a. The diffused optical signal Lr transmits through the optical fiber 35 towards the right and left ends thereof, and the portion of the optical signal Lr transmitted leftward is received by the optical signal conversion unit 33a via the optical high pass filter 32a, while the portion of the optical signal Lr transmitted rightward is received by the optical signal conversion unit 33b via the optical high pass filter 32b.

Figure 1:
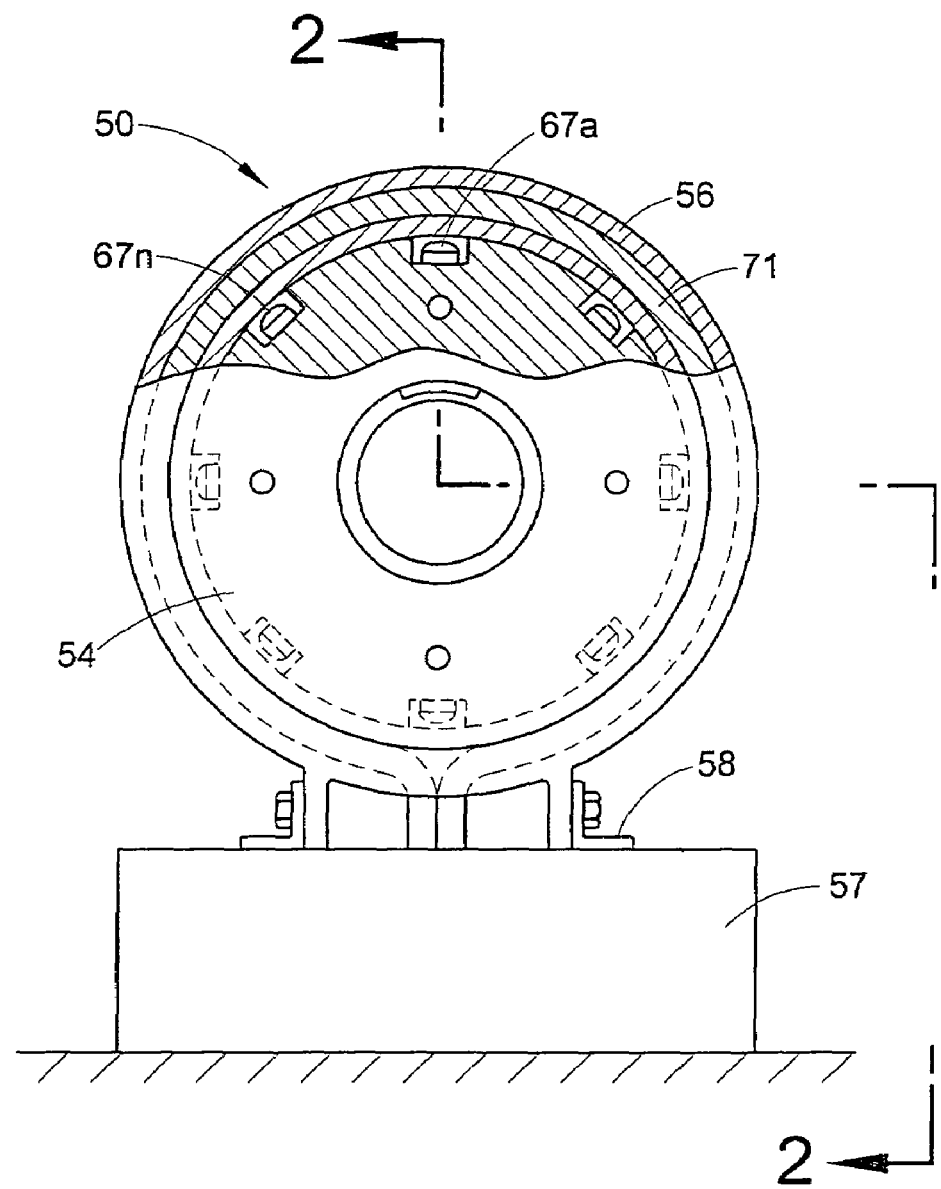
FIG. 1 is a front view of a conventional torque measuring apparatus.
Figure 2:
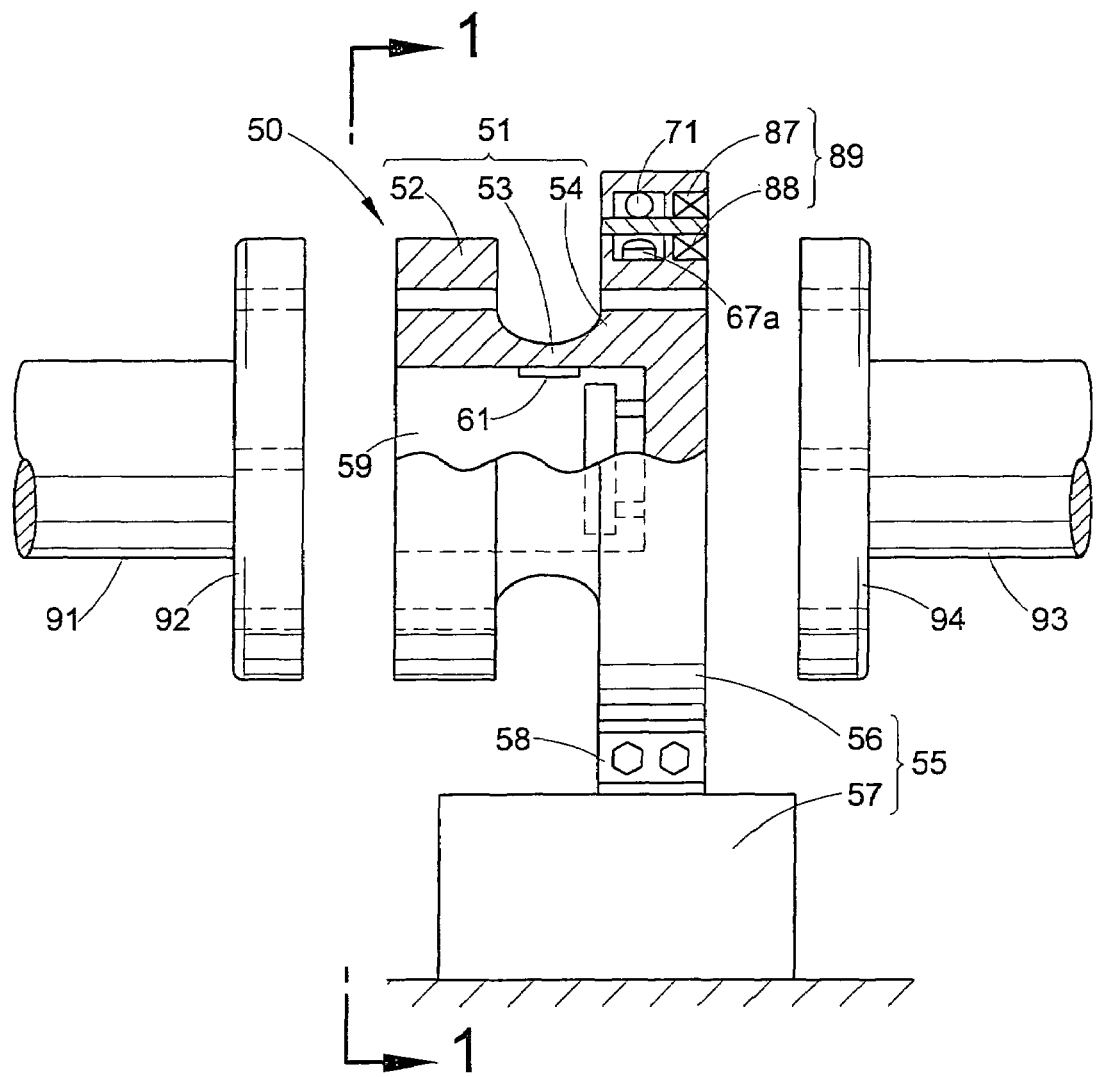
FIG. 2 is a partial cross sectional side view of the conventional torque measuring apparatus.

When the load-side flange portion 14 rotates further as indicated by the arrow R, an optical signal Lc vertically emitted from the light emitting element 27a with respect to the optical fiber 35 is diffused by the diffusion layer 35a. The thus diffused optical signal Lc transmits through the optical fiber 35 with the diffusion layer 35a rightwards and leftwards, and is received in the same manner as the optical signal Lr by the optical signal conversion units 33a and 33b via the optical high pass filters 32a and 32b, respectively. When the load-side flange portion 14 rotates further as indicated by the arrow R, an optical signal L1 obliquely emitted from the light emitting element 27a toward the left end portion of the optical fiber 35 is similarly diffused by the optical diffusion layer 35a, and is received in the same way as the optical signal Lr by the optical signal conversion units 33a and 33b via the optical high pass filters 32a and 32b, respectively. In this way, with the optical fiber 35 with the diffusion layer 35a, the light emitted from the light emitting element 27a is continuously received. Subsequently the light emitted from the light emitting elements 27b to 27n shown in FIG. 1 is continuously received by the optical fiber 35. The optical signals received by the optical signal conversion units 33a and 33b are converted to electrical torque signals, thus performing torque detection.

As described above, in the torque measuring apparatus of the second embodiment of the present invention, the optical fiber 35 that receives the optical signal from the light emitting elements 27a to 27n is attached to the chassis 17. The optical fiber 35 can easily be attached or detached and therefore workability of an optical fiber attachment and maintenance is improved, and the optical signals from the light emitting elements are efficiently received.

Although the optical fiber 35 has its entire peripheral surface covered with the diffusion layer 35a except for it sends, only the linear portion along its length, or the upper side of the peripheral surface of the optical fiber 35 may be covered by the diffusion layer 35a.

Further, a plurality of optical fibers 35 with diffusion layers may be provided, so that light can be received by one or more of optical signal conversion units at its or their both ends.

Figure 7A:
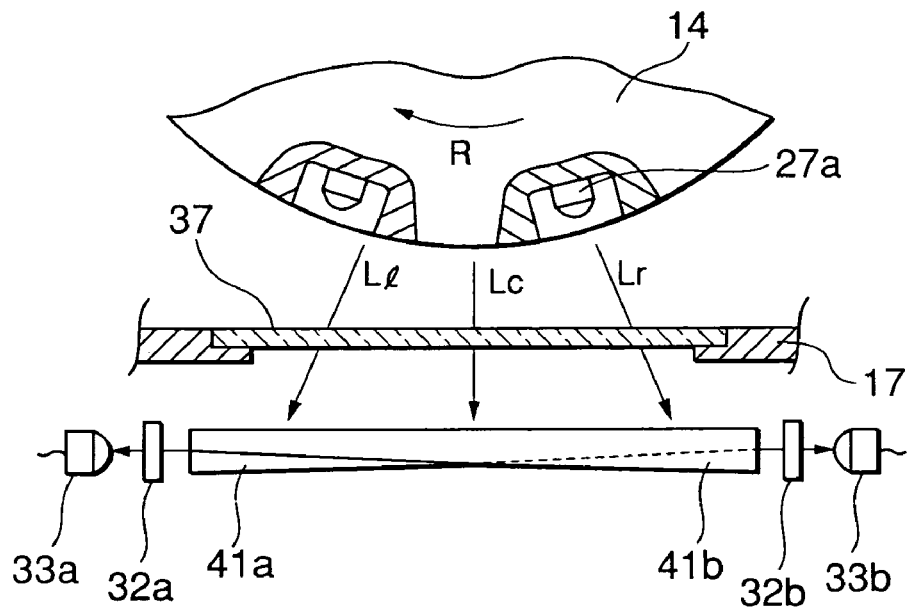
FIG. 7A is a partial front view of a torque measuring apparatus according to a third embodiment of the present invention.
Figure 7B:
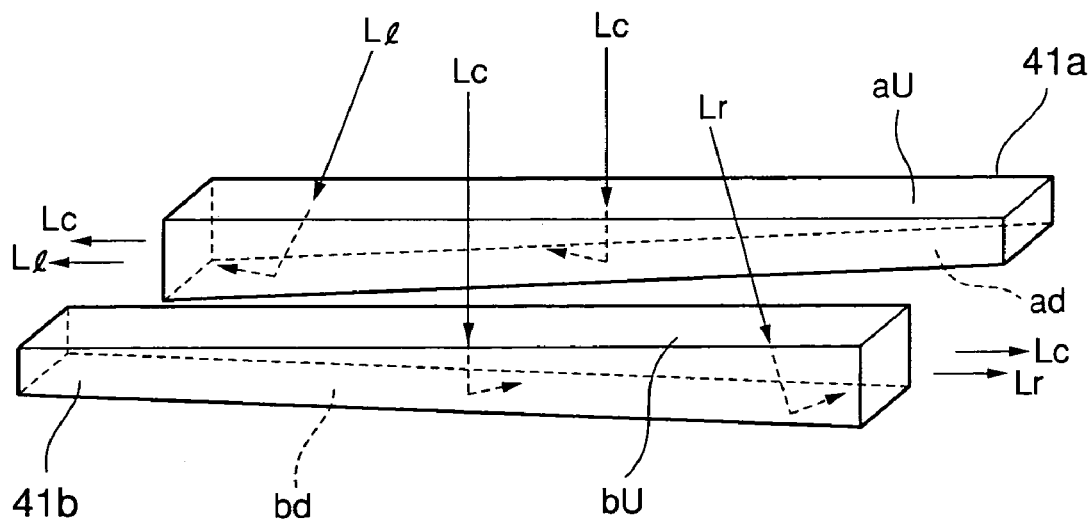
FIG. 7B is a perspective view of the light guiding plate used.

FIG. 7A is a partial front view of a torque measuring apparatus according to a third embodiment of the present invention, and FIG. 7B is a perspective view of the light guiding plate used in this embodiment.

As shown in FIG. 7A, the torque measuring apparatus of the third embodiment does not use the optical fiber and diffusion plate, but uses instead light guiding plates 41a and 41b arranged side by side and a transparent plate 37 provided on the chassis 17. Since the structure of the torque measuring apparatus of this embodiment is the same as the torque measuring apparatus of the first embodiment except for the light guiding plates 41a and 41b and transparent plate 37, explanation thereof will be omitted.

As shown in FIG. 7B, the light guiding plates 41a and 41b have their lower surfaces ad and bd inclined with respect to their horizontally arranged upper surfaces aU and bU respectively, so that an optical signal incident on the upper surfaces aU and bU is reflected by the inclined lower surfaces ad and bd and transmitted in the horizontal direction, and transmitted out of the side surfaces. The light guiding plates 41a and 41b have the lower surfaces ad and bd inclined in opposite directions to each other in their longitudinal directions as shown in FIG. 7B and are arranged side by side so that their side surfaces are close to or jointed to each other and both attached to the chassis 17.

The optical signal Lr obliquely emitted from the light emitting element 27a toward the right portion of the light guiding plate 41b is introduced to the light guiding plate 41b from the upper surface bU, reflected by the lower surface bd, and transmits through the light guiding plate 41b rightwards, and is output out of the right end surface thereof. The optical signal Lr output from the light guiding plate 41b is received by the optical signal conversion unit 33b via the optical high pass filter 32b.

When the load-side flange portion 14 rotates further as indicated by the arrow R, the optical signal Lc is vertically emitted from the light emitting element 27a onto the light guiding plates 41a and 41b. A portion of the optical signal Lc is introduced into the light guiding plate 41a from the upper surface aU, reflected by the lower surface ad, and transmits through the light guiding plate 41a leftward. The portion of the optical signal Lc that outputs from the left end surface is received by the optical signal conversion unit 33a via the optical high-pass filter 32a. Another portion of the optical signal Lc is introduced into the light guiding plate 41b from the upper surface bU, reflected by the lower surface bd, and transmits through the light guiding plate 41b rightward toward the right end surface. This portion of the optical signals Lc that outputs from the right end surface of the light guiding plate 41b is received by the optical signal conversion unit 33b via the optical high-pass filter 32b.

When the load-side flange portion 14 rotates further as indicated by the arrow R, the optical signal Ll obliquely emitted from the light emitting element 27a onto the left portion of the light guiding plate 41a is introduced into the light guiding plate 41a from the upper surface aU, reflected by the lower surface ad, and transmits through the light guiding plate 41a towards the left end surface. The optical signal Ll that outputs from the left end surface is received by the optical signal conversion unit 33a via the optical high pass filter 32a. In this way, light receiving operation is continuously performed by means of the light guiding plates 41a and 41b with respect to the optical signals emitted from the light emitting element 27a. Subsequently similar light receiving operations are continuously performed with respect to the optical signals emitted from the light emitting elements 27b to 27n in the order shown in FIG. 3. The optical signals received by the optical signal conversion units 33a and 33b are converted to electrical torque signals, thus performing torque detection.

It is to be noted that although the optical signal Lr is also incident on the light guiding plate 41a, it is not received at the right end of the light guiding plate 41a because there is little reflection in the right horizontal direction, while although the optical signal Ll is also incident on the light guiding plate 41b, it is not received at the left end of the light guiding plate 41b because there is little reflection in the left horizontal direction.

As described above, in the torque measuring apparatus of the third embodiment of the present invention, the optical signals from the light emitting elements are received by the light guiding plates 41a and 41b, which are attached to the chassis 17. Therefore workability of attachment and detachment, and maintenance of these light guiding plates 41a and 41b as parts of the torque measuring apparatus can be improved, and the optical signals from the light emitting elements can be efficiently received.

The rotor torque measuring apparatus of the present invention comprises a rotor having a hollow body portion formed between a drive-side flange portion and a load-side flange portion; light emitting elements disposed on a periphery of the rotor for emitting optical signals based on an output from a torque detection unit attached on a hollow portion of the hollow body portion; a diffusion means for diffusing the optical signals; and a light receiving fiber attached to a chassis disposed outside the rotor for receiving the optical signals via the diffusion portion. Therefore workability of attachment of the optical fiber for receiving a torque optical signal from the rotor can be improved, and the light receiving efficiency of optical signals can be improved by the provision of the diffusion portion.

As the diffusion means may comprise a diffusion plate for diffusing optical signals and the diffusion plate is attached on the rotor side of the chassis, the optical fiber can be protected by the diffusion plate and the light receiving efficiency of optical signals can be improved.

Further, as the diffusion portion may be a diffusion layer provided on the surface of the optical fiber, the light receiving efficiency of optical signals can be improved with a simple structure.

Furthermore, the torque measuring apparatus of the present invention comprises a rotor having a hollow body portion formed between a drive-side flange portion and a load-side flange portion; light emitting elements disposed on the periphery of the rotor for emitting optical signals based on an output from a torque detection unit arranged on a hollow portion of the hollow body portion; and a light guiding plate attached to a chassis disposed outside the rotor, for receiving the optical signals in a planar portion thereof and guiding the optical signals along the planar portion. Therefore the workability of attachment of the light receiving fiber for receiving a torque optical signal from the rotor can be improved, and the light receiving efficiency of optical signals can be improved by the provision of the light guiding plate.

While preferred embodiments of the present invention have been described in detail for illustrative purpose, it is to be understood that the inventive concepts herein disclosed may be otherwise variously embodied and employed and that the appended claims are intended to be construed to include such variations except insofar as limited by the prior art.

What is claimed is:

1. A torque measuring apparatus comprising:
   a rotor having a hollow body portion formed between a drive-side flange portion and a load-side flange portion;
   light emitting elements disposed on a periphery of the rotor, for emitting optical signals based on an output from a torque detection unit arranged on a hollow portion of the hollow body portion;
   a diffusion means for diffusing the optical signals;
   a light receiving fiber attached to a chassis disposed outside the rotor, for receiving the optical signals via the diffusion portion, the light receiving fiber having L-shaped curved portions at each end;
   a shielding plate arranged between each of the L-shaped curved portions and the light emitting elements; and
   optical high pass filters, each filter positioned between one end of the light receiving fiber and a respective optical signal conversion unit.

2. The torque measuring apparatus according to claim 1, wherein the diffusion means comprises a diffusion plate mounted on a portion of the chassis opposing to the rotor for diffusing optical signals.

3. The torque measuring apparatus according to claim 1, wherein the diffusion means comprises a diffusion layer disposed on a surface of the light receiving fiber.

4. A torque measuring apparatus comprising:
- a rotor having a hollow body portion formed between a drive-side flange portion and a load-side flange portion;
- light emitting elements disposed on a periphery of the rotor, for emitting optical signals based on an output from a torque detection unit arranged on a hollow portion of the hollow body portion;
- a light guiding plate attached to a chassis disposed outside the rotor, for receiving the optical signals in a planar portion thereof and guiding the optical signals along the planar portion;
- a shielding plate arranged between the light guiding plate and the light emitting elements; and
- optical high pass filters, each filter positioned between one end of the light guiding plate and a respective optical signal conversion unit.

5. The torque measuring apparatus according to claim 1, further comprising a rotary transformer including:
- a primary coil including a half structured annular portion, the half structured annular portion including a first semi-annular portion and a second semi-annular portion whose upper ends are connected by a conductive connecting member, and whose remaining ends are fixed in an insulated state; and
- a secondary coil on the periphery of the load-side flange portion.

6. A torque measuring apparatus comprising:
- a rotor having a hollow body portion formed between a drive-side flange portion and a load-side flange portion;
- at least one light emitting element disposed on a periphery of the rotor, for emitting an optical signal based on an output from a torque detection unit arranged on a hollow portion of the hollow body portion;
- a light guiding plate attached to a chassis disposed outside the rotor, for receiving the optical signal in a planar portion thereof and guiding the optical signal along the planar portion;
- a shielding plate arranged between the light guiding plate and the at least one light emitting element;
- at least one optical high pass filter, the at least one filter being positioned between one end of the light guiding plate and at least one optical signal conversion unit; and
- a rotary transformer including:
  - a primary coil including a half structured annular portion, the half structured annular portion including a first semi-annular portion and a second semi-annular portion whose upper ends are connected by a conductive connecting member, and whose remaining ends are fixed in an insulated state; and
  - a secondary coil located on the periphery of the load-side flange portion.

\* \* \* \* \*